(12) United States Patent
Ganesan (10) Patent No.: US 7,674,431 B2
(45) Date of Patent: *Mar. 9, 2010

(54) MICROFLUIDIC DEVICES HAVING A REDUCED NUMBER OF INPUT AND OUTPUT CONNECTIONS

(75) Inventor: Karthik Ganesan, Ann Arbor, MI (US)

(73) Assignee: HandyLab, Inc., Ann Arbor, MI (US)

( * ) Notice: Subject to any disclaimer, the term of this patent is extended or adjusted under 35 U.S.C. 154(b) by 1312 days.

This patent is subject to a terminal disclaimer.

(21) Appl. No.: 10/489,404

(22) PCT Filed: Sep. 12, 2002

(86) PCT No.: PCT/US02/29012

§ 371 (c)(1),
(2), (4) Date: Mar. 7, 2005

(87) PCT Pub. No.: WO03/002242

PCT Pub. Date: Mar. 20, 2003

(65) Prior Publication Data

US 2005/0152808 A1    Jul. 14, 2005

(51) Int. Cl.
*G01N 33/00* (2006.01)

(52) U.S. Cl. .................. 422/100; 422/68.1; 422/99; 422/102

(58) Field of Classification Search ............ 422/68.1, 422/99, 102, 100
See application file for complete search history.

(56) References Cited

U.S. PATENT DOCUMENTS 1,616,419 A    2/1927    Wilson (Continued)

FOREIGN PATENT DOCUMENTS

WO    WO 98/53311    11/1998

(Continued)

OTHER PUBLICATIONS

U.S. Appl. No. 11/929,877, filed Oct. 30, 2007, Ganesan et al.

(Continued)

*Primary Examiner*—Sam P Siefke
(74) *Attorney, Agent, or Firm*—Knobbe, Martens, Olson & Bear, LLP (57) ABSTRACT

A system and method for reducing the number of input/output connections required to connect a microfluidic substrate to an external controller for controlling the substrate. In one example, a microfluidic processing device is fabricated on a substrate having a plurality of N independently controllable components, (e.g., a resistive heating elements) each having at least two terminals. The substrate includes a plurality of input/output contacts for connecting the substrate to an external controller, and a plurality of leads for connecting the contacts to the terminals of the components. The leads are arranged to allow the external controller to supply control signals to the terminals of the components via the contacts using substantially fewer contacts than the total number of component terminals. For example, in one embodiment, each lead connects a corresponding contact to a plurality of terminals to allow the controller to supply to signals to the terminals without requiring a separate contact for each terminal. However, to assure that the components can each be controlled independently of the others, the leads are also arranged so that each component's terminals are connected to a unique combination of contacts. Thus, the external controller can activate a selected component by supplying control signals to the combination of contacts uniquely associated with that component.

20 Claims, 10 Drawing Sheets

U.S. PATENT DOCUMENTS

| | | |
|---|---|---|
| 1,773,401 A | 8/1930 | Lovekin |
| 3,528,449 A | 9/1970 | Witte et al. |
| 4,139,005 A | 2/1979 | Dickey |
| 4,457,329 A | 7/1984 | Werley et al. |
| 4,522,786 A | 6/1985 | Ebersole |
| 4,599,315 A | 7/1986 | Terasaki et al. |
| 4,612,959 A | 9/1986 | Costello |
| 4,654,127 A | 3/1987 | Baker et al. |
| 4,673,657 A | 6/1987 | Christian |
| 4,798,693 A | 1/1989 | Mase et al. |
| 4,919,892 A | 4/1990 | Plumb |
| 4,946,562 A | 8/1990 | Guruswamy |
| 4,949,742 A | 8/1990 | Rando et al. |
| 4,963,498 A | 10/1990 | Hillman et al. |
| 4,967,950 A | 11/1990 | Legg et al. |
| 4,989,626 A | 2/1991 | Takagi et al. |
| 5,001,417 A | 3/1991 | Pumphrey et al. |
| 5,004,583 A | 4/1991 | Guruswamy et al. |
| 5,048,554 A | 9/1991 | Kremer |
| 5,053,199 A | 10/1991 | Keiser et al. |
| 5,061,336 A | 10/1991 | Soane |
| 5,064,618 A | 11/1991 | Baker et al. |
| 5,071,531 A | 12/1991 | Soane |
| 5,096,669 A | 3/1992 | Lauks et al. |
| 5,126,022 A | 6/1992 | Soane et al. |
| 5,135,627 A | 8/1992 | Soane |
| 5,135,872 A | 8/1992 | Pouletty et al. |
| 5,147,606 A | 9/1992 | Charlton et al. |
| 5,192,507 A | 3/1993 | Taylor et al. |
| 5,208,163 A | 5/1993 | Charlton et al. |
| 5,250,263 A | 10/1993 | Manz |
| 5,282,950 A | 2/1994 | Dietze et al. |
| 5,296,375 A | 3/1994 | Kricka et al. |
| 5,304,477 A | 4/1994 | Nagoh et al. |
| 5,304,487 A | 4/1994 | Wilding et al. |
| 5,311,896 A | 5/1994 | Kaartinen |
| 5,316,727 A | 5/1994 | Suzuki et al. |
| 5,327,038 A | 7/1994 | Culp |
| 5,339,486 A | 8/1994 | Persic, Jr. |
| 5,364,591 A | 11/1994 | Green et al. |
| 5,372,946 A | 12/1994 | Cusak et al. |
| 5,374,395 A | 12/1994 | Robinson et al. |
| 5,411,708 A | 5/1995 | Moscetta |
| 5,416,000 A | 5/1995 | Allen et al. |
| 5,422,271 A | 6/1995 | Chen et al. |
| 5,427,946 A | 6/1995 | Kricka et al. |
| 5,486,335 A | 1/1996 | Wilding et al. |
| 5,494,639 A | 2/1996 | Grzegorzewski |
| 5,498,392 A | 3/1996 | Wilding et al. |
| 5,503,803 A | 4/1996 | Brown |
| 5,519,635 A | 5/1996 | Miyake et al. |
| 5,559,432 A | 9/1996 | Logue |
| 5,565,171 A | 10/1996 | Dovichi et al. |
| 5,569,364 A | 10/1996 | Hooper et al. |
| 5,580,523 A | 12/1996 | Bard |
| 5,585,069 A | 12/1996 | Zanzucchi et al. |
| 5,585,089 A | 12/1996 | Queen et al. |
| 5,587,128 A | 12/1996 | Wilding et al. |
| 5,589,136 A | 12/1996 | Northrup et al. |
| 5,593,838 A | 1/1997 | Zanzucchi et al. |
| 5,599,432 A | 2/1997 | Manz et al. |
| 5,599,503 A | 2/1997 | Manz et al. |
| 5,603,351 A | 2/1997 | Cherukuri et al. |
| 5,605,662 A | 2/1997 | Heller et al. |
| 5,628,890 A | 5/1997 | Carter et al. |
| 5,631,337 A | 5/1997 | Sassi et al. |
| 5,632,876 A | 5/1997 | Zanzucchi et al. |
| 5,632,957 A | 5/1997 | Heller et al. |
| 5,635,358 A | 6/1997 | Wilding et al. |
| 5,639,423 A | 6/1997 | Northrup et al. |
| 5,643,738 A | 7/1997 | Zanzucchi et al. |
| 5,646,039 A | 7/1997 | Northrup et al. |
| 5,651,839 A | 7/1997 | Rauf |
| 5,652,149 A | 7/1997 | Mileaf et al. |
| 5,674,742 A | 10/1997 | Northrup et al. |
| 5,681,484 A | 10/1997 | Zanzucchi et al. |
| 5,681,529 A | 10/1997 | Taguchi et al. |
| 5,683,657 A | 11/1997 | Mian |
| 5,699,157 A | 12/1997 | Parce et al. |
| 5,705,813 A | 1/1998 | Apffel et al. |
| 5,726,026 A | 3/1998 | Wilding et al. |
| 5,726,404 A | 3/1998 | Brody |
| 5,731,212 A | 3/1998 | Gavin et al. |
| 5,744,366 A | 4/1998 | Kricka et al. |
| 5,747,666 A | 5/1998 | Willis |
| 5,750,015 A | 5/1998 | Soane et al. |
| 5,755,942 A | 5/1998 | Zanzucchi et al. |
| 5,763,262 A | 6/1998 | Wong et al. |
| 5,770,029 A | 6/1998 | Nelson et al. |
| 5,772,966 A | 6/1998 | Maracas et al. |
| 5,779,868 A | 7/1998 | Parce et al. |
| 5,787,032 A | 7/1998 | Heller et al. |
| 5,788,814 A | 8/1998 | Sun et al. |
| 5,800,690 A | 9/1998 | Chow et al. |
| 5,827,481 A | 10/1998 | Bente et al. |
| 5,842,106 A | 11/1998 | Thaler et al. |
| 5,842,787 A | 12/1998 | Kopf-Sill et al. |
| 5,846,396 A | 12/1998 | Zanzucchi et al. |
| 5,849,208 A | 12/1998 | Hayes et al. |
| 5,849,486 A | 12/1998 | Heller et al. |
| 5,849,489 A | 12/1998 | Heller et al. |
| 5,849,598 A | 12/1998 | Wilson et al. |
| 5,852,495 A | 12/1998 | Parce et al. |
| 5,856,174 A | 1/1999 | Lipshutz et al. |
| 5,858,188 A | 1/1999 | Soane et al. |
| 5,863,502 A | 1/1999 | Southgate et al. |
| 5,863,708 A | 1/1999 | Zanzucchi et al. |
| 5,863,801 A | 1/1999 | Southgate et al. |
| 5,866,345 A | 2/1999 | Wilding et al. |
| 5,869,004 A | 2/1999 | Parce et al. |
| 5,872,010 A | 2/1999 | Karger et al. |
| 5,874,046 A | 2/1999 | Megerle |
| 5,876,675 A | 3/1999 | Kennedy |
| 5,880,071 A | 3/1999 | Parce et al. |
| 5,882,465 A | 3/1999 | McReynolds |
| 5,883,211 A | 3/1999 | Sassi et al. |
| 5,885,432 A | 3/1999 | Hooper et al. |
| 5,885,470 A | 3/1999 | Parce et al. |
| 5,895,762 A | 4/1999 | Greenfield et al. |
| 5,900,130 A | 5/1999 | Benvegnu et al. |
| 5,912,124 A | 6/1999 | Kumar |
| 5,912,134 A | 6/1999 | Shartle |
| 5,916,522 A | 6/1999 | Boyd et al. |
| 5,916,776 A | 6/1999 | Kumar |
| 5,919,711 A | 7/1999 | Boyd et al. |
| 5,922,591 A | 7/1999 | Anderson et al. |
| 5,927,547 A | 7/1999 | Papen et al. |
| 5,928,880 A | 7/1999 | Wilding et al. |
| 5,929,208 A | 7/1999 | Heller et al. |
| 5,932,799 A | 8/1999 | Moles |
| 5,935,401 A | 8/1999 | Amigo |
| 5,939,291 A | 8/1999 | Loewy et al. |
| 5,942,443 A | 8/1999 | Parce et al. |
| 5,948,227 A | 9/1999 | Dubrow et al. |
| 5,955,028 A | 9/1999 | Chow et al. |
| 5,955,029 A | 9/1999 | Wilding et al. |
| 5,957,579 A | 9/1999 | Kopf-Sill et al. |
| 5,958,203 A | 9/1999 | Parce et al. |
| 5,958,694 A | 9/1999 | Nikiforov et al. |
| 5,959,291 A | 9/1999 | Jensen |
| 5,964,995 A | 10/1999 | Nikiforov et al. |
| 5,964,997 A | 10/1999 | McBride |
| 5,965,001 A | 10/1999 | Chow et al. |
| 5,965,410 A | 10/1999 | Chow et al. |

| | | | |
|---|---|---|---|
| 5,965,886 | A | 10/1999 | Sauer et al. |
| 5,972,187 | A | 10/1999 | Parce et al. |
| 5,976,336 | A | 11/1999 | Dubrow et al. |
| 5,980,704 | A | 11/1999 | Cherukuri et al. |
| 5,980,719 | A | 11/1999 | Cherukuri et al. |
| 5,989,402 | A | 11/1999 | Chow et al. |
| 5,992,820 | A | 11/1999 | Fare et al. |
| 5,993,611 | A | 11/1999 | Moroney, III et al. |
| 5,993,750 | A | 11/1999 | Ghosh et al. |
| 5,997,708 | A | 12/1999 | Craig |
| 6,001,231 | A | 12/1999 | Kopf-Sill |
| 6,001,307 | A | 12/1999 | Naka et al. |
| 6,004,515 | A | 12/1999 | Parce et al. |
| 6,007,690 | A | 12/1999 | Nelson et al. |
| 6,012,902 | A | 1/2000 | Parce et al. |
| 6,043,080 | A | 3/2000 | Lipshutz et al. |
| 6,046,056 | A | 4/2000 | Parce et al. |
| 6,048,734 | A | 4/2000 | Burns et al. |
| 6,054,034 | A | 4/2000 | Soane et al. |
| 6,056,860 | A | 5/2000 | Amigo et al. |
| 6,057,149 | A | 5/2000 | Burns et al. |
| 6,063,589 | A | 5/2000 | Kellogg et al. |
| 6,102,897 | A | 8/2000 | Lang |
| 6,130,098 | A | 10/2000 | Handique et al. |
| 6,168,948 | B1 | 1/2001 | Anderson et al. |
| 6,174,675 | B1 | 1/2001 | Chow et al. |
| 6,235,175 | B1 | 5/2001 | Dubrow et al. |
| 6,251,343 | B1 | 6/2001 | Dubrow et al. |
| 6,261,431 | B1 | 7/2001 | Mathies et al. |
| 6,274,089 | B1 | 8/2001 | Chow et al. |
| 6,287,254 | B1 | 9/2001 | Dodds |
| 6,306,273 | B1 | 10/2001 | Wainright et al. |
| 6,319,469 | B1 | 11/2001 | Mian et al. |
| 6,326,211 | B1 | 12/2001 | Anderson et al. |
| 6,375,901 | B1 | 4/2002 | Robotti et al. |
| 6,379,929 | B1 | 4/2002 | Burns et al. |
| 6,379,974 | B1 | 4/2002 | Parce et al. |
| 6,391,541 | B1 | 5/2002 | Petersen et al. |
| 6,399,025 | B1 | 6/2002 | Chow |
| 6,440,725 | B1 | 8/2002 | Pourahmadi et al. |
| 6,444,461 | B1 | 9/2002 | Knapp et al. |
| 6,453,928 | B1 | 9/2002 | Kaplan et al. |
| 6,534,295 | B2 | 3/2003 | Tai et al. |
| 6,544,734 | B1 | 4/2003 | Briscoe et al. |
| 6,572,830 | B1 | 6/2003 | Burdon et al. |
| 6,575,188 | B2 | 6/2003 | Parunak |
| 6,852,287 | B2 | 2/2005 | Ganesan |
| 7,010,391 | B2 | 3/2006 | Handique et al. |
| 2005/0084424 | A1 | 4/2005 | Ganesan et al. |

FOREIGN PATENT DOCUMENTS

| | | |
|---|---|---|
| WO | WO 99/12016 | 3/1999 |
| WO | WO 01/41931 | 6/2001 |
| WO | WO 01/89681 | 11/2001 |
| WO | WO 02/078845 | 10/2002 |
| WO | WO 03/055605 | 7/2003 |

OTHER PUBLICATIONS

Brahmassandra, S. et al., "On-chip DNA Detection in Microfabricated Separation Systems", Part of the SPIE conference on Microfluidic Devices and Systems (Santa Clara, California), vol. 3515, pp. 242-251 (1998).

Brody, et al., "Diffusion-based extraction in a microfabricated device", *Sensors and Actuators* (Elsevier), vol. A58 No. 1: pp. 13-18 (1997).

Broyles et al., "Sample Filtration, Concentration, and Separation Integrated on Microfluidic Devices", *Analytical Chemistry*, vol. 75, No. 11, pp. 2761-2767 (2003).

Burns et al., "An Integrated Nanoliter DNA Analysis Device", *Science* 282:484-487 (1998).

Carlen, E.T. et al., "Paraffin actuated surface micromachined valves", The Thirteenth Annual International Conference on Micro Electro Mechanical Systems 2000, (Jan. 2000), pp. 381-385.

Handique et al., "On-Chip Thermopneumatic Pressure for Discrete Drop Pumping", *Anal. Chem.* 73:1831-1838 (2000).

Handique, K. et al., "Mathematical Modeling of Drop Mixing in a Slit-Type Microchannel", *J. Micromech. Microeng.*, 11:548-554 (2001).

Handique, K. et al., "Microfluidic flow control using selective hydrophobic patterning", *SPIE*, vol. 3224, pp. 185-194 (1997).

Handique, K. et al., "Nanoliter Liquid Metering in Microchannels Using Hydrophobic Patterns", *Anal. Chem.*, 72:4100-4109 (2000).

Handique, K. et al., "Nanoliter-volume discrete drop injection and pumping in microfabricated chemical analysis systems", Solid-State Sensor and Actuator Workshop (Hilton Head, South Carolina, Jun. 8-11, 1998) pp. 346-349.

He, B. et al., "Microfabricated Filters for Microfluidic Analytical Systems", *Analytical Chemistry*, vol. 71, No. 7 (1999), pp. 1464-1468.

Ibrahim, M.S. et al., "Real-Time Microchip PCR for Detecting Single-Base Differences in Viral and Human DNA", *Analytical Chemistry*, vol. 70, No. 9 (1998), pp. 2013-2017.

Khandurina, J. et al., "Microfabricated Porous Membrane Structure for Sample Concentration and Electrophoretic Analysis", *Analytical Chemistry*, vol. 71, No. 9 (1999), pp. 1815-1819.

Kopp, M.U. et al., "Chemical Amplification: Continuous-Flow PCR on a Chip", *Science*, vol. 280 (May 15, 1998), pp. 1046-1048.

Kutter, J.P. et al., "Solid Phase Extraction on Microfluidic Devices", *J. Microcolumn Separations*, vol. 12, No. 2 (2000), pp. 93-97.

Lagally, E.T. et al., "Single-Molecule DNA Amplification and Analysis in an Integrated Microfluidic Device", *Analytical Chemistry*, vol. 73, No. 3 (2001), pp. 565-570.

Livache, T. et al., "Polypyrrole DNA chip on a Silicon Device: Example of Hepatitis C Virus Genotyping", *Analytical Biochemistry*, vol. 255 (1998), pp. 188-194

Northrup, M.A. et al., "A Miniature Analytical Instrument for Nucleic Acids Based on Micromachined Silicon Reaction Chambers", *Analytical Chemistry*, vol. 70, No. 5 (1998), pp. 918-922.

Oleschuk, R. et al., "Trapping of Bead-Based Reagents within Microfluidic Systems: On-Chip Solid-Phase Extraction and Electrochromatography", *Analytical Chemistry*, vol. 72, No. 3 (2000), pp. 585-590.

Orchid Biosciences, Inc. www.orchid.com, Jul. 6, 2001.

Ross, P.L. et al., "Analysis of DNA Fragments from Conventional and Microfabricated PCR Devices Using Delayed Extraction MALDI-TOF Mass Spectrometry", *Analytical Chemistry*, vol. 70, No. 10 (1998), pp. 2067-2073.

Waters, et al., "Microchip Device for Cell Lysis, Multiplex PCR Amplification, and Electrophoretic Sizing" *Analytical Chemistry*, vol. 70, No. 1, pp. 158-162 (1998).

Weigl, B.H. et al., "Microfluidic Diffusion-Based Separation and Detection", *Science*, vol. 283 (Jan. 15, 1999), pp. 346-347.

MICROFLUIDIC DEVICES HAVING A REDUCED NUMBER OF INPUT AND OUTPUT CONNECTIONS

FIELD OF THE INVENTION

The present invention relates to microfluidic devices, and more particularly to techniques for reducing the number of input and output connections required to connect a microfluidic device to an external controller for controlling the microfluidic device.

BACKGROUND OF THE INVENTION

Micro/nano technology devices are known in the art as devices with components on the scale of 1 µm to 100s of µm that cooperate to perform various desired functions. In particular, microfluidic devices are micro/nano technology devices that perform fluid handling functions which, for example, cooperate to carry out a chemical or biochemical reaction or analysis.

Microfluidic devices include a variety of components for manipulating and analyzing the fluid within the devices. Typically, these elements are microfabricated from substrates made of silicon, glass, ceramic, plastic, and/or quartz. These various fluid-processing components are linked by microchannels, etched into the same substrate, through which the fluid flows under the control of a fluid propulsion mechanism. Electronic components may also be fabricated on the substrate, allowing sensors and controlling circuitry to be incorporated in the same device. Because all of the components are made using conventional photolithographic techniques, multi-component devices can be readily assembled into complex, integrated systems.

Most microfluidic devices in the prior art are based on fluid flowing through micro-scale passages and chambers, either continuously or in relatively large aliquots. Fluid flow is usually initiated and controlled by electro-osmotic and electrophoretic forces. See, e.g., U.S. Pat. No. 5,632,876, issued Apr. 27, 1997 and entitled "Apparatus and Methods for Controlling Fluid Flow in Microchannels;" U.S. Pat. No. 5,992,820, issued Nov. 30, 1999 and entitled "Flow Control in Microfluidics Devices by Controlled Bubble Formation;" U.S. Pat. No. 5,637,469, issued Jun. 10, 1997 and entitled "Methods and Apparatus for the Detection of an Analyte Utilizing Mesoscale Flow Systems;" U.S. Pat. No. 5,800,690, issued Sep. 1, 1998 and entitled "Variable Control of Electroosmotic and/or Electrophoretic Forces Within a Fluid-Containing Structure Via Electrical Forces;" and U.S. Pat. No. 6,001,231, issued Dec. 14, 1999 and entitled "Methods and Systems for Monitoring and Controlling Fluid Flow Rates in Microfluidic Systems." See also products from, e.g., Orchid, Inc. (www.orchid.com) and Caliper Technologies, Inc. (www.calipertech.com).

Microfluidic devices that manipulate very small aliquots of fluids (known herein as "micro-droplets") in micro-scale passages rely principally on pressure and other non-electric forces to move the liquid volume. These devices are advantageous because smaller volumes of reagents are required and because non-electric propulsion forces can be generated using relatively small voltages, on the same order of magnitude as voltages required by standard microelectronic components. See, i.e. the following patents, the contents of which are incorporated herein in their entirety by reference: U.S. Pat. Nos. 6,057,149, issued May 2, 2000 and entitled "Microscale Devices And Reactions In Microscale Devices;" 6,048,734, issued Apr. 11, 2000 and entitled "Thermal Microvalves in a Fluid Flow Method;" and 6,130,098, issued Oct. 10, 2000. (Citation or identification of any reference in this section or any section of this application shall not be construed that such reference is available as prior art to the present invention).

U.S. Pat. No. 6,130,098 ("the '098 patent"), for example, discloses microfluidic devices that include micro-droplet channels for transporting fluid droplets through a fluid processing system. The system includes a variety of micro-scale components for processing the fluid droplets, including micro-reaction chambers, electrophoresis modules, and detectors (such as radiation detectors). In some embodiments, the devices also include air chambers coupled to resistive heaters to internally generate air pressure to automatically withdraw a measured volume of fluid from an input port, and to propel the measured micro-droplet through the microfluidic device.

These components are connected to input/output (I/O) pins at the edge of the micro-fluid device which mate with corresponding I/O pins of the external controller. The external controller operates these components by sending and receiving control signals via the input/output pins. For example, a control device, external to the microfluidic device, activates a resistive heater within a microfluidic device by supplying current to the heater through the input/output pins. Microfluidic devices can include a large number of such components which are controlled by external devices. Accordingly, an object of the present invention is to reduce the number of input/output pins required for controlling such microfluidic devices from such external controllers.

SUMMARY OF THE INVENTION

The invention relates generally to techniques for reducing the number of input/output connections required to connect a microfluidic substrate to an external controller for controlling the substrate. In one aspect, the invention involves a microfluidic processing device fabricated on a substrate having a plurality of N independently controllable components, (e.g., resistive heating elements) each having at least two terminals. The substrate includes a plurality of input/output contacts for connecting the substrate to an external controller, and a plurality of leads for connecting the contacts to the terminals of the components.

The leads are arranged to allow the external controller to supply control signals to the terminals of the components via the contacts using substantially fewer contacts than the total number of component terminals. For example, in one embodiment, each lead connects a corresponding contact to a plurality of terminals to allow the controller to supply to signals to the terminals without requiring a separate contact for each terminal. The number of contacts may be less than about 50% of the number of components. However, to assure that the components can each be controlled independently of the others, the leads are also arranged so that each component's terminals are connected to a unique combination of contacts. Thus, the external controller can activate a selected component by supplying control signals to the combination of contacts uniquely associated with that component.

The substrate of the microfabricated device preferably includes elements such as valves or pumps, which cooperate to manipulate fluid within channels and chambers of the substrate. For example, the substrate may include a thermally actuated valve. At least one of the N independently controllable components is a heating element in thermal communication with the thermally actuated valve. Actuation of the heating element actuates the valve, whereupon the valve opens or closes. The substrate may include a plurality of thermally actuated valves and a plurality of the N independently controllable components are heating elements in thermal communication with respective thermally actuated valves.

The substrate may include a thermally actuated pump comprising a volume of fluid. At least one of the N independently controllable components is a heating element in thermal communication with the volume of fluid, whereby actuation of the heating element heats the fluid and actuates the thermally actuated pump. For example, the fluid may be a gas, whereby expansion of the gas propels a microfluidic sample along a channel of the substrate. The substrate may include a plurality of thermally actuated pumps. Fluid of each pump is in thermal communication with at least one heating element.

The substrate may include at least one microfabricated reaction chamber, such as a chamber configured to perform a polymerase chain reaction. At least one of the N independently controllable components is a heating element in thermal communication with the reaction chamber, whereby actuation of the heating element may raise a temperature of material present in the reaction chamber. At least one of the N independently controllable components may be a heat sensor in thermal communication with the reaction chamber, whereby the temperature of the material present in the reaction chamber may be determined.

BRIEF DESCRIPTION OF THE FIGURES

The present invention may be understood more fully by reference to the following detailed description of the preferred embodiment of the present invention, illustrative examples of specific embodiments of the invention, and the appended figures wherein.

DETAILED DESCRIPTION OF THE PREFERRED EMBODIMENT

System Overview

Figure 1:
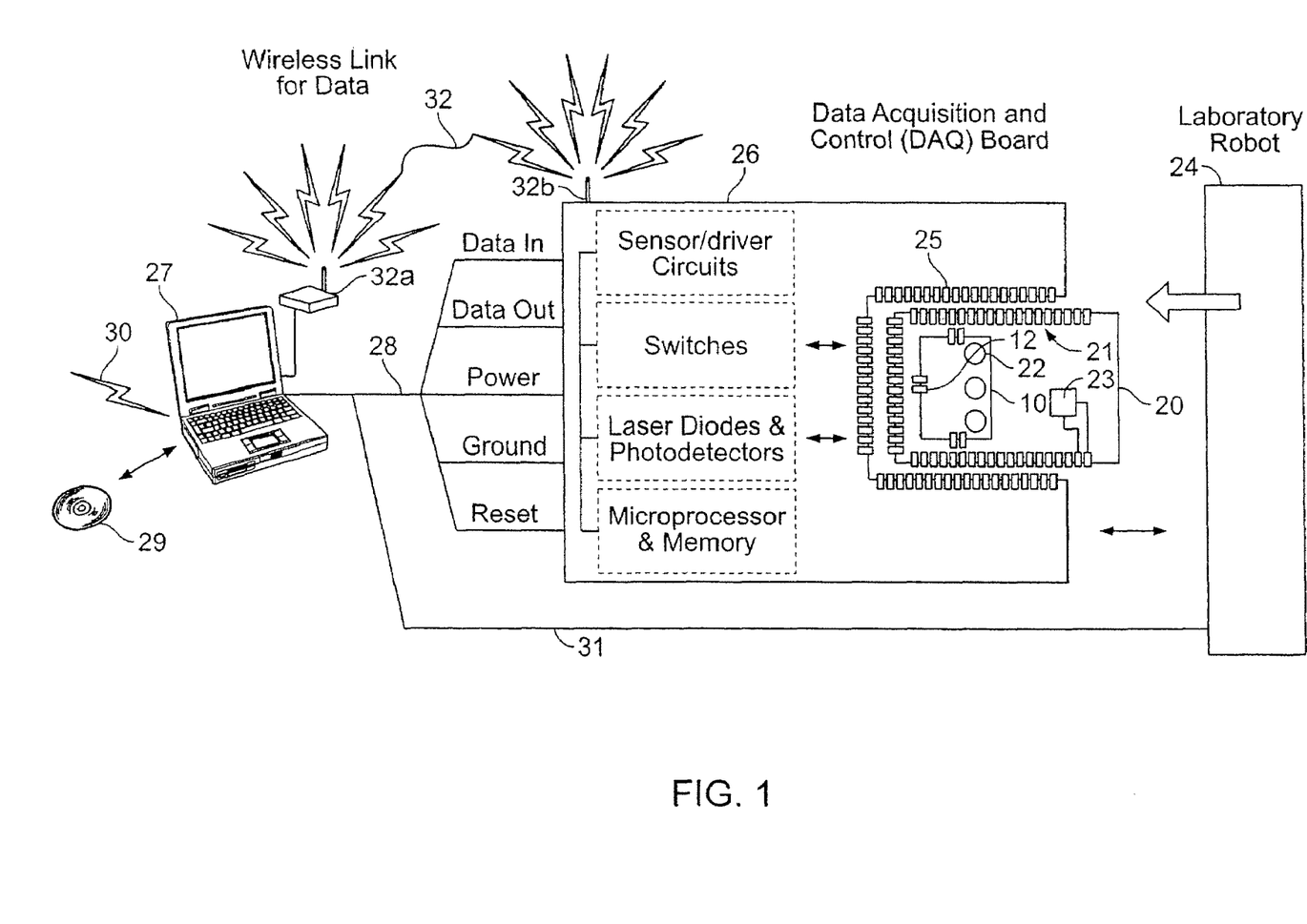
FIG. 1 illustrates a microfluidic control system having a discrete droplet microfluidic processing device, an external controller, and a general purpose computer.

FIG. 1 depicts a microfluidic processing system that includes a microfluidic substrate 10, a chip carrier cartridge 20, a data acquisition and control board ("DAQ") 26, and a portable computer 27 such as a laptop or palmtop computer. Microfluidic substrate 10 has microchannels and fluid control elements formed in a solid substrate such as silicon, glass, or other suitable material, preferably microfabricated using conventional photolithographic techniques. The microfluidic substrate 10 is mounted on the chip carrier cartridge 20. The microfluidic substrate 10 has electrical and optical connections 12 with the chip carrier cartridge for carrying electrical and optical signals between the microfluidic substrate and the chip carrier. For example, the electrical connections can be formed with well-known wire bonding techniques. Furthermore, the chip carrier cartridge 20 has electrical and optical contacts 21 for carrying electrical and optical signals between the microfluidic substrate and the data acquisition board 26.

The chip carrier cartridge 20 is shown being inserted into (or removed from) an interface hardware receptacle of DAQ 26 having electrical and optical contacts 25 standardized to mate with a corresponding contacts 21 of the chip carrier cartridge. Most contacts are for electrical signals, while certain are for optical signals (IR, visible, UV, etc.) in the case of optically-monitored or optically-excited microfluidic processors. Alternatively (not shown), the entire data acquisition and control board 26 may be a single ASIC chip that is incorporated into the chip carrier cartridge 20, wherein contacts 21, 25 would become lines on a printed circuit board.

In general, DAQ 26 controls the operation of microfluidic substrate 10 via contacts 12, 21, 25 using electrical and optical signals. Portable computer 27 typically performs high level functions, such as supplying a user interface that allows the user to select desired operations and to view the results of such operations. As shown in FIG. 1, the computer 27 is connected to DAQ 26 via connection 28, which provides data I/O, power, ground, reset, and other function connectivity. Computer 27 can also, as shown, be used to control a laboratory robot 24 via link 31. Alternatively, a wireless link 32 between the computer 27 and the DAQ 26 may be provided for data and control signal exchange via wireless elements 32(a) and 32(b). Where the data link is a wireless link, for example, the DAQ 26 may have separate power source such as, for example, a battery.

The present invention is directed to techniques for reducing the number of contacts 12, 21, 25 required for communication between the microfluidic substrate 10, chip carrier cartridge 20, and the external controller or controllers such as DAQ 26.

As explained below, the number of such contacts can become extremely large for microfluidic substrates that include many components which are independently controlled by an external controller. The following description of the operation of a microfluidic substrate 10 and DAQ 26 demonstrates the relationship between the complexity of the microfluidic substrate and the requisite number of contacts 12, 21, 25.

Structure of Microfluidic Processor

In the example shown in FIG. 1, a microfluidic substrate 10 includes three inlet ports 22 for accepting fluid reagents or samples. Preferably, these inlet ports are in a standard position on the substrate so that laboratory robot 24, where available, may be easily programmed for automatic loading of ports of several types of microfluidic processors. Otherwise, the ports should be accessible for manual loading. Where possible, reagents may also be pre-packaged on the microfluidic substrate and/or the chip carrier 20. Additionally, chip carrier 20 has micro-circuit 23 accessible through standard connectors for storing, for example, self-descriptive processor information. Alternately, chip carrier cartridge 20 may bear indicia such as a bar code to indicate the device type or further information.

Figure 2:
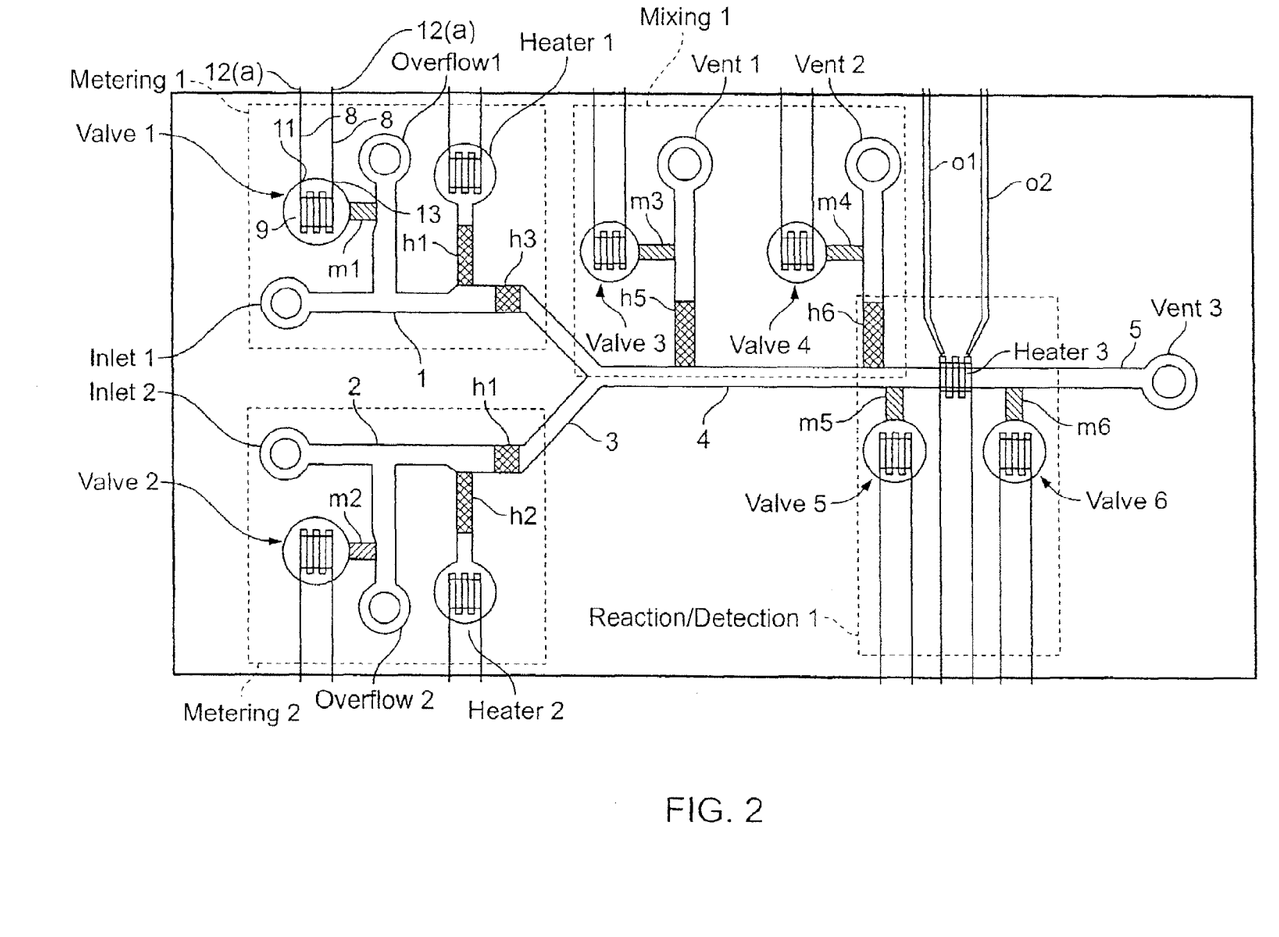
FIG. 2 illustrates the discrete droplet microfluidic processing device of FIG. 1.

FIG. 2 illustrates, schematically and not to scale, the general structure of an exemplary integrated microfluidic substrate. This microfluidic substrate is constructed from three types of sub-assemblies. In particular, this substrate has four separate sub-assemblies: two micro-droplet metering sub-assemblies, metering1 and metering2; one mixing sub-assembly, mixing 1; and one reaction/detection sub-assembly, reaction/detection1.

These sub-assemblies are constructed from a variety of components or actuators as shown. The components include heater actuators, valve actuators, and an optical detector, all interconnected with passive inlets, overflows, vents, and reservoirs. More specifically, sub-assembly metering1 includes inlet1, overflow1, valve1, heater1, and passage1. Similarly, sub-assembly metering2 includes inlet2, overflow2, valve2, heater2, and passage2. The mixing subassembly, mixing 1, includes heater1, heater2, valve3, valve4, vent1, vent2, Y-shaped passage3, and passage4. Finally, reaction/detection1 sub-assembly includes valve5, valve6, heater3, and passage5.

Operations of the sub-assemblies result from the coordinated operations of their component actuators under the control of an external controller, DAQ 26. The specific operation of microfluidic substrate 10 is described in greater detail in co-pending application Ser. No. 09/819,105, which is incorporated herein by reference. However, the following describes the general operation of the fluid processor under the control of DAQ 26.

First, fluid is introduced into inlet1, for example, by an external robotic device, and flows up to the stable position created by the first hydrophobic region h3 just beyond the widening of passage 1. Any excess fluid flows out through port overflow1. Next, DAQ 26 instructs sub-assembly metering1 to measure a micro-droplet of determined volume from an aliquot of fluid introduced through port inlet1, as described in co-pending application Ser. No. 09/819,105. Sub-assembly metering2 is constructed and operates similarly to extract a measured micro-droplet of fluid from a second fluid sample likewise supplied at inlet 2.

After the pair of microdroplets are extracted from the inlet ports, DAQ 26 supplies current to heater1 and heater2 to generate gas pressure to propel the two micro-droplets through Y-shaped passage 3 and along passage 4 to the stable position in passage 5 just beyond the junction of the side passage to vent2. During this step, the two microdroplets merge and mix to form a single, larger micro-droplet.

Next, DAQ 26 supplies current to valve5 and valve6 to close these valves and isolate the micro-droplet along passage 5. DAQ 26 directs the sub-assembly reaction/detection1 to stimulate a reaction in the trapped micro-droplet by, for example, supplying current to heater 3, which heats the micro-droplet. The DAQ then monitors the results of the stimulated reaction by optically detecting radiation conducted by optical paths o1 and o2. DAQ 26 performs these control functions by selectively supplying electrical (and sometimes optical) signals to the microfluidic substrate via contacts 12, 21, 25.

DAQ Board Architecture

Figure 3:
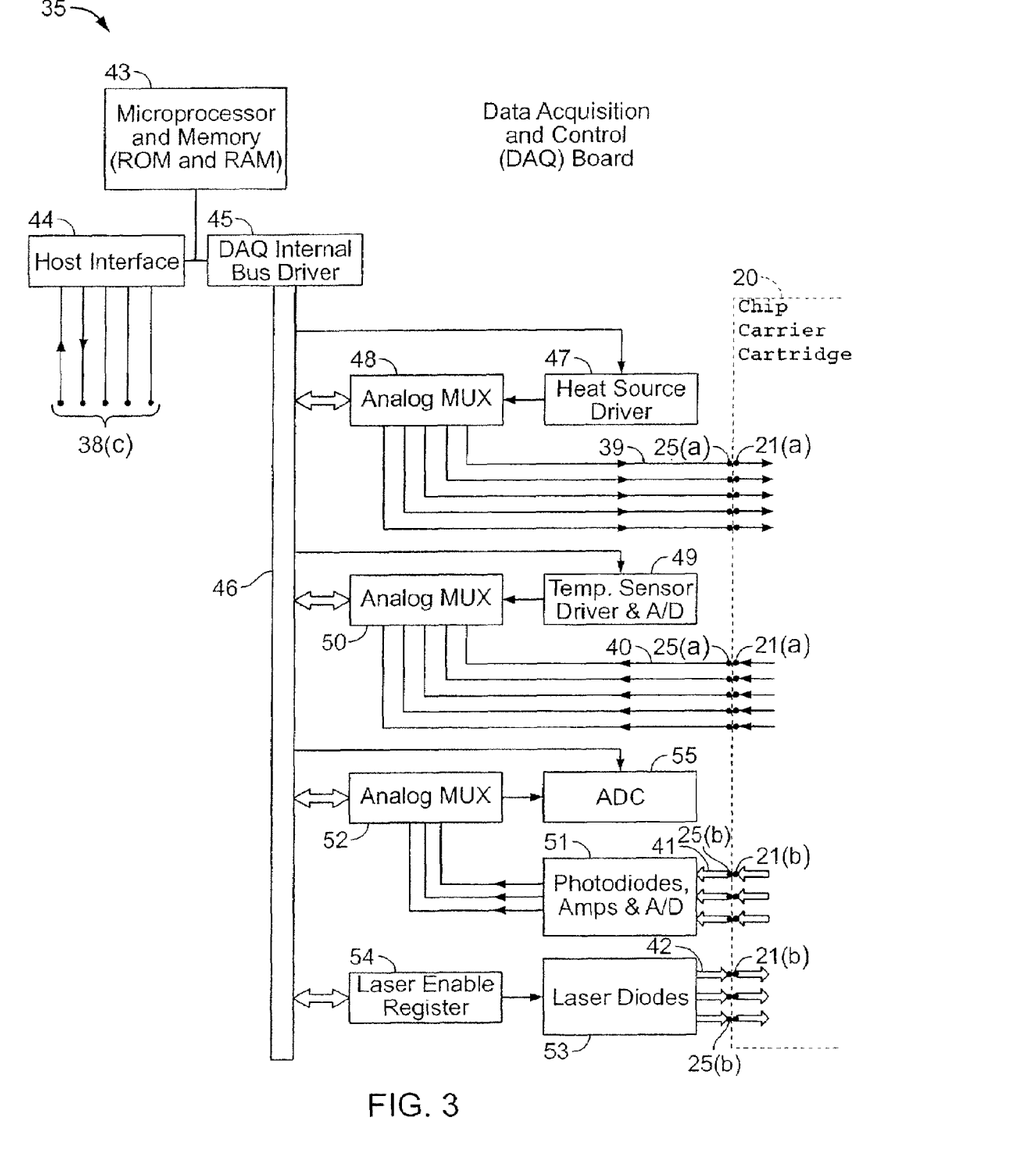
FIG. 3 illustrates the external controller of FIG. 1.

FIG. 3 illustrates a preferred hardware architecture for DAQ board 26. The DAQ board has one or more receptacles, slots, or sockets, where one or more replaceable microfluidic processors may be accommodated in a firmly supporting manner with good contact to its external contacts.

As shown, electrical contacts 25(a) on the DAQ mate with corresponding contacts 21(a) of the chip carrier cartridge 20. Thus, leads 39, 40 of the DAQ are electrically connected to corresponding leads of the chip carrier cartridge 20. Similarly, contacts 25(b) of the DAQ mate with contacts 21(b) of the chip carrier cartridge, thereby connecting via light pipe, line of sight, or by other suitable means, the DAQ's optical couplings 41,42 to corresponding optical couplings on the chip carrier cartridge. The electrical and optical leads of the chip carrier cartridge are, in turn, connected to the microfluidic substrate 10 via contacts 12. Thus, DAQ 26 can send and receive electrical and optical signals via contacts 12, 21, 25 to and from microfluidic substrate 10 in order to engage and control a variety of components or actuators located thereon.

The electrical contacts, which may have many embodiments, are illustrated here as edge contacts that are engaged when the chip carrier cartridge and microfluidic substrate are inserted in a DAQ board receptacle. Alternatively, contacts may be suitable for engaging a flexible ribbon cable, by multi-pin sockets, for example. The optical contacts may be of types known for connecting fiber-optic cables.

The DAQ includes one or more heater drivers 47 for supplying a specified amount of current. The output of each heater driver 47 is connected to an analog multiplexor 48 that routes the current from the driver to a selected I/O contact 25(a). For sensing functions, the DAQ includes one or more temperature sensor drivers 49 which are each connected to an analog multiplexor 50 that multiplexes each temperature sensor driver 49 to a selected one of the plurality of I/O contacts 25(a). The DAQ also includes one or more photodiodes 51 for optical detection. Multiplexor 52 multiplexes these optical detectors to an analog-to digital converter ("ADC") 55 via a selected one of the plurality of I/O contacts 25(b). Finally, the DAQ is shown including one or more laser diodes 53. Laser enable register 54 enables selected laser diode drivers, thereby emitting light signals on corresponding optical couplings 42 and optical contacts 25 (b).

Also shown in FIG. 3, the DAQ also includes a microprocessor and memory 43 for controlling the operation of the heater drivers 47, temperature sensor drivers 49, photodiodes 51, laser diodes 53 and their associated analog multiplexors 48, 50, 52, as well as laser enable register 54. More specifically, the microprocessor sends control signals to these devices via a bus driver 45 and bus 46, and reads status information from the sensing elements via the same driver 45 and bus 46. Finally, host interface 44 allows the microprocessor 43 to communicate with the general purpose computer 27 (FIG. 1) via leads 38(c) or, as described above, via wireless means.

The operation of the DAQ is exemplified by the following description of the control of a simple resistive heater, such as the resistive heater shown in valve 1 of the microfluidic device depicted in FIG. 2. As shown in FIG. 2, valve 1 includes a resistive heating element 9 that is connected at its terminals 11, 13 to a pair of I/O contacts 12(a) via leads 8. The DAQ activates this resistive heating element by instructing analog multiplexor 48 to connect the output of heater driver 47 to a pair of I/O contacts 25(a) that are connected to corresponding I/O contacts 21(a) of the chip carrier cartridge 20, that are connected to corresponding contacts 12(a) of the substrate. It then instructs heater driver 47 to supply a selected amount of current. The current supplied by heater driver 47 flows through analog multiplexor 48 and to the resistive heating element 9 via the selected leads 39 and 8.

The Relationship Between the Number of I/O Pins and the Number of Control Elements on the Microfluidic Processor For a two terminal device, such as the resistive heater described above, the system must use two I/O contacts to supply the control signals for operation of the device. Thus, if the number of two-terminal devices on the microfluidic process is N, then 2×N I/O contacts are sufficient to allow DAQ 26 to independently control each of the devices.

However, for complex microfluidic devices the number of I/O contacts can be unreasonably large. In the simple microfluidic device shown in FIG. 2, where only nine different resistive heating elements are shown, only eighteen contacts are required. For increasingly complex microfluidic devices having hundreds of independently controlled components, the number of contacts becomes excessive.

Figure 4A:
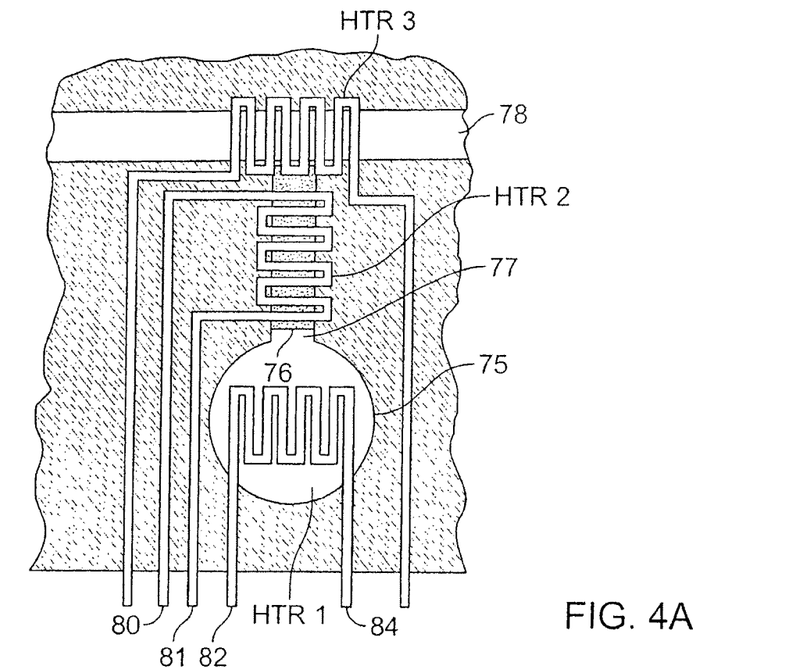
FIGS. 4A-B illustrate a micro-valve actuator.
Figure 4B:
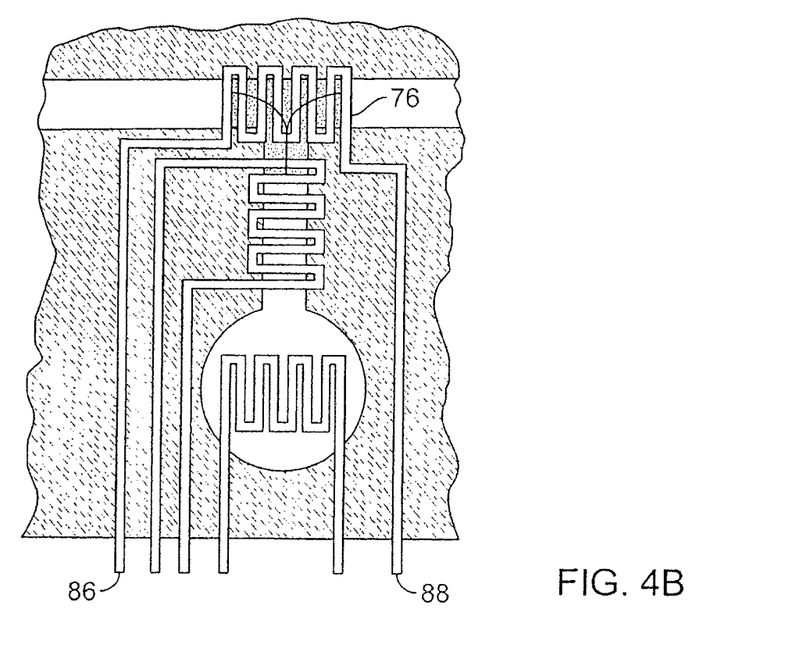

Moreover, for discrete droplet fluid processing systems such as described in co-pending application Ser. No. 09/819,105, even relatively simple microfluidic processors may employ a large number of contacts. For example, FIGS. 4A and 4B depict a preferred valve structure for such fluid processing systems that includes three separate resistive heaters for each valve. Referring to FIGS. 4A and 4B, the operation of the preferred valve structure is described in detail below.

FIG. 4A depicts the valve in its open position, having a wax plug 76 positioned within side channel 77. To close this valve, DAQ controller supplies current to resistive heater HTR2 via I/O contacts 80, 81. This causes HTR2 to warm, thereby melting plug 76. DAQ 26 then supplies current to HTR1 via I/O contacts 82, 84 to thereby heat gas within chamber 75. As the gas expands, it forces plug 76 to move into channel 78 as shown in FIG. 4B. DAQ 26 then shuts off heater HTR2 and allows the plug to cool, thereby blocking channel 78 and side channel 77. When the plug is cool, DAQ 26 then shuts off HTR1. As HTR1 cools, the pressure in chamber 75 drops, thereby creating a negative pressure which, as will be explained below, may be used to re-open the valve.

To open the valve, DAQ 26 supplies current to HTR3 via I/O pins 86, 88 to warm the heater and thereby melt the plug. Once the plug is melted, the negative pressure in chamber 75 draws the plug back into side channel 77, thereby re-opening channel 78.

If such bidirectional valves are used to implement the microfluidic device shown in FIG. 2, the number of independently controlled resistive elements nearly triples from nine to twenty-one. However, to accurately control the temperature of each of these resistive elements, even more components may be used.

Figure 5:
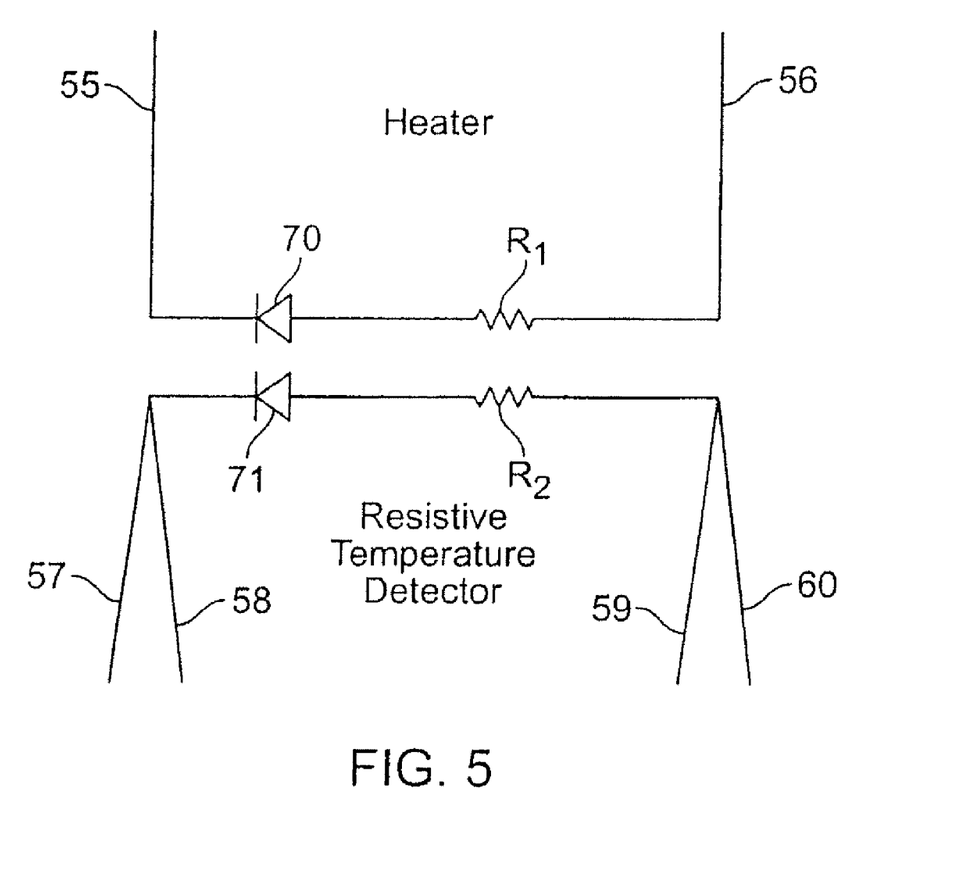
FIG. 5 illustrates a heating component having resistive temperature detectors.

FIG. 5 depicts a six-terminal resistive heating device. The device includes a two terminal heating element R1 that operates in accordance with heating element 9 of FIG. 2. The device also includes a current flow directional element 70, which allows current to flow substantially only in a single direction between leads 55, 56. As shown in FIG. 5, current flow directional element 70 is a diode configured to allow current to flow from lead 56 to lead 55. Current flow directional element 70 substantially prevents, and preferably excludes, current flow from lead 55 to lead 56. Current flow directional element 70 may be any element that allows current to flow predominately in one direction between points of a circuit. Diodes are preferred current flow directional elements.

The device of FIG. 5 also includes a four terminal resistive sensor element R2 in close proximity to R1 so as to be in thermal communication therewith. A current flow directional element 71, which has generally the same functional characteristics as current flow directional element 70, allows current to flow in substantially one direction between leads 57, 58 and leads 59, 60. In the configuration shown, current flow directional element 71 allows current to flow from leads 59, 60 to leads 57, 58 but substantially prevents, and preferably excludes, current flow from leads 57, 58 to leads 59, 60.

Current flow directional elements 70 and 71 may be but are not necessarily formed by microfabrication on a substrate with elements R1 and R2. Rather, current flow directional elements 70 and 71 may be disposed at other positions along current pathways that respectively include R1 and R2. Current flow directional elements 70 and 71 are preferably disposed in series with R1 and R2.

The sensor R2 may operate as follows. While DAQ 26 supplies current to R1 (via leads 55,56) it also supplies a relatively low current to R2 via leads 57,60. R2 is a resistive element whose resistance increases with temperature. Accordingly, the voltage across R2 increases with the temperature in the nearby region being heated by heating element R1, and therefore element R2 can be used to measure the temperature in this region. DAQ 26 determines the temperature by measuring the voltage across R2 via leads 58, 59. More specifically, referring now to FIG. 3, DAQ 26 instructs the analog multiplexor to connect temperature sensor driver 49 to the contact pins 25(a) which are connected to leads 58, 59. Temperature sensor driver 49 then determines the voltage across R2, thereby providing a measure of the temperature in the vicinity of R1

Thus, if such devices are used in a microfluidic processor, the number of I/O contacts increases even further. For example, one hundred and twenty six contacts are required for the micro-fluid processor shown in FIG. 2.

The present invention is directed to techniques for reducing the number of I/O contacts required for an external controller, such as DAQ 26, to independently control a large number of components within microfluidic devices, such as those described above.

Figure 6A:
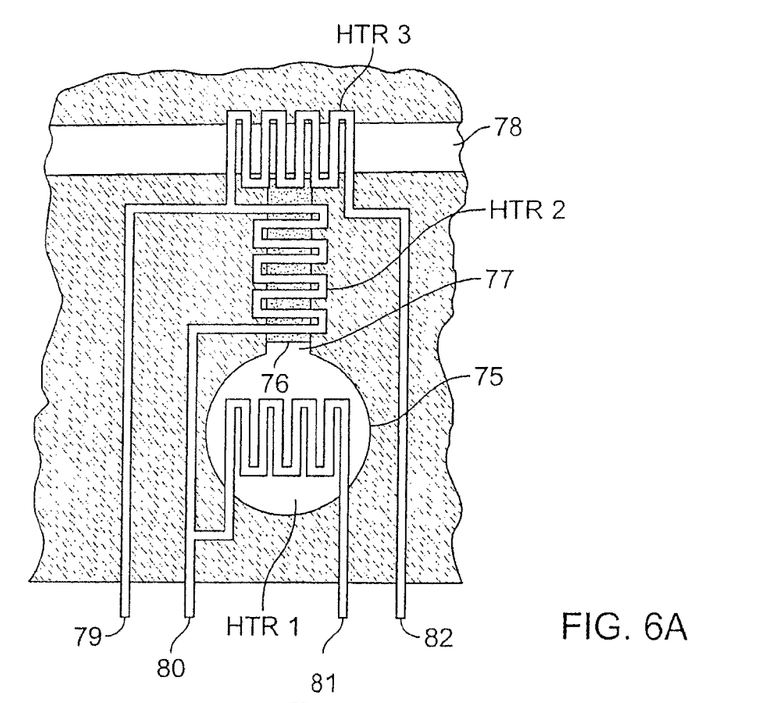
FIGS. 6A-B illustrate a micro-valve actuator having a reduced number of I/O contacts.
Figure 6B:
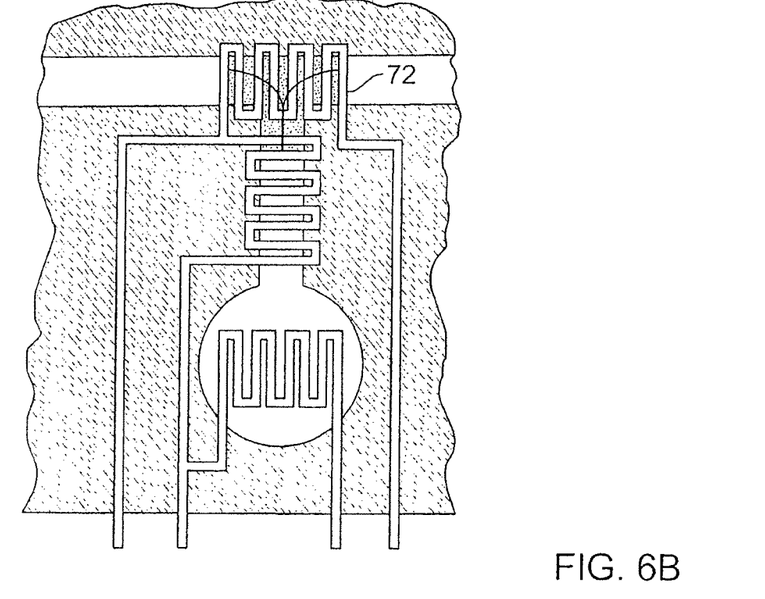

FIGS. 6A, 6B illustrate a technique for reducing the number of I/O contacts by structuring the leads of the microfluidic device so that each lead serves more than one component, while still allowing DAQ 26 to control each component of the microfluidic device independently of the others. Specifically, FIGS. 6A, 6B depicts a technique for sharing I/O contacts among three of the two-terminal resistors of a bidirectional value structure, such as shown in FIGS. 4A-B discussed above. The valve operates essentially the same as the valve shown in FIGS. 4A, B, except that it uses only four contacts rather than six. In this example, each resistor is connected to a pair of I/O contacts and therefore can be controlled by the DAQ in the same way as described above. Although the other resistors share these I/O contacts, no resistor shares the same pair of contacts with another. Accordingly, the DAQ is able to supply current to any given resistor via the pair of associated contacts, without activating any other resistor.

More generally, the number of I/O contacts required for the independent control of a plurality of resistive heaters may be reduced by arranging the contact wiring to each resistor in the form of a logical array. The resulting compression of the number of I/O contacts advantageously simplifies communication with the entire processor. Because each resistor requires two leads to complete an electrical circuit, according to a conventional arrangement of leads and contacts, a device having N resistors requires 2N leads and 2N contacts. By configuring the contact wiring in a shared array, however, the number of required contacts can be reduced to as few as 2√N. For example, in a device comprising 100 resistors, the number of external contacts can be reduced from 200 to 20.

Figure 7A:
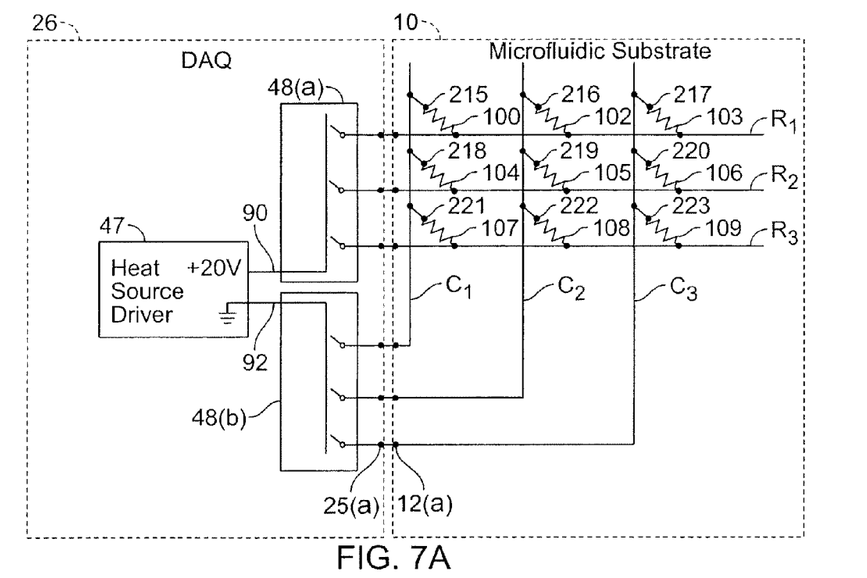
FIGS. 7A-B illustrate a technique for sharing conductive leads that supply current to resistive heaters within a microfluidic processing device.
Figure 7B:
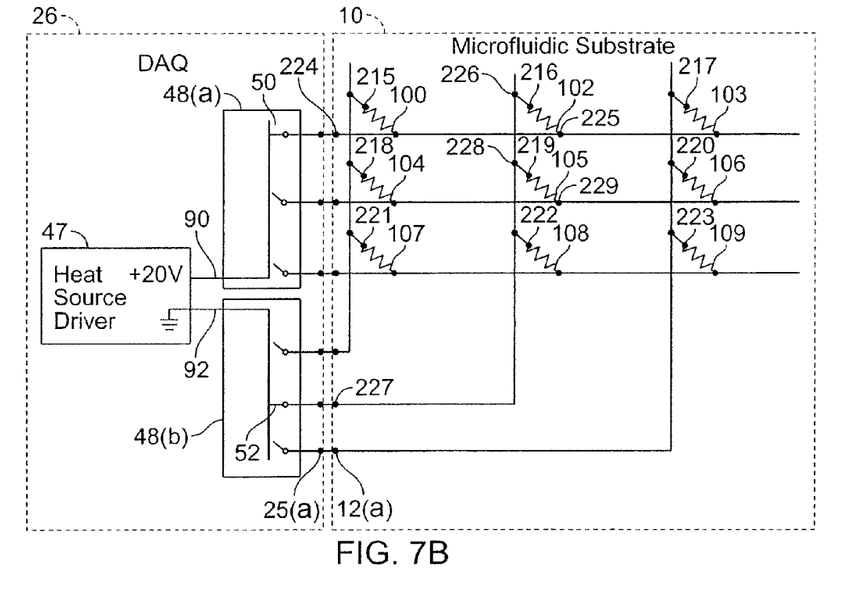

FIGS. 7A, 7B depict a DAQ 26 directly connected to a microfluidic substrate 10, without the use of an intermediate chip carrier cartridge 20, and show an array of resistive heaters within microfluidic substrate 10. The leads between contacts 12(a) and resistive heaters 100, 102-109 are shown arranged in columns and rows. However, the actual physical layout of the leads will not necessarily be a physical array. Rather, the leads will be directly routed from the resistive components to contacts 12(a) in any manner that allows each lead to connect to a plurality of resistors while remaining electrically isolated from other leads.

According to this arrangement, electrical contacts for N resistors are assigned to R rows and C columns such that the product RC≧N, preferably where R is approximately equal to C, and most preferably where R=C. With this arrangement, resistors assigned to the same row share a common electrical lead and I/O contact 12(a). Similarly, resistors assigned to the same column also share a lead and I/O contact 12(a). However, each resistor has a unique address, corresponding to a unique pair of I/O contacts, (i.e., to its unique row/column combination in the array). Therefore, each resistor is individually actuatable by supplying electric current to the appropriate pair of I/O contacts.

As used herein, a "resistor" or "component" that is uniquely associated with a pair of contacts may also refer to a resistive network having a plurality of resistive sub-components connected in series and/or parallel) or a component network (having a plurality of sub-components connected in series or parallel). In such embodiments, all sub-components are activated together when the external controller supplies signals across the pair of contacts uniquely associated with those sub-components.

As shown in FIG. 7A, the leads are arranged in three rows ($R_j$, where j=1-3) and three columns ($C_i$, where i=1-3). For each resistor, one terminal is connected to a row and the other terminal is connected to a column. Although each resistor share these leads with other resistors, no two resistors share the same pair of leads. In other words. each resistor is uniquely associated with a particular row/column pair $R_j$, $C_i$.

FIGS. 7A, 7B illustrate the operation of this structure. Heater driver 47 supplies an output voltage of twenty volts on its terminals for supplying current to resistive heating elements 100, 102-109. The positive output terminal 90 is connected to a first analog multiplexor 48(a). As shown, this terminal can be connected to any one of the rows of the array of leads by individual switching elements within analog multiplexor 48(a). Similarly, the negative output terminal 92 of heater driver 47 is connected to a second analog multiplexor 48(b). Multiplexer 48(b) allows negative output terminal 92 to connect to any column in the array of leads.

In FIG. 7A, the switching elements within analog multiplexors 48(a,b) are all open. Accordingly, none of the resistive heating elements 100, 102-109 as shown are active. FIG. 7B depicts the condition of analog multiplexors 48(a,b) after DAQ 26 has instructed them to close certain internal switches to thereby supply current to a selected on the resistors in the array. In this example, the row switch element 50 is closed, to thereby connect the positive terminal of heater driver 47 to the top row of the lead array. The column switch element 52 is also closed to connect the negative terminal of heater driver 47 to the middle column of the lead array. Thus, the positive output terminal 90 of heater driver 47 is connected to resistors 100, 102, 103 and the negative output terminal 92 is connected to resistors 102, 102, 108. However, only one of these resistors, 102, is connected across both terminals of heater driver 47. Accordingly only resistor 102 receives current and is heated.

Resistive heating elements 100, 102-109 are disposed in series with respective current flow directional elements 215-223, which allow current to flow in one direction between the positive output terminal 90 of a heater driver 47 and a negative or ground terminal 92 of heater driver 47 along a current path that includes one of the resistive heating elements 100, 102-109. Current flow directional elements 215-223 are preferably configured to allow current to flow only from positive output terminal 90 to negative output terminal 92. Thus, for example, current may flow from a point 224 to a point 225, through resistive heater 102 to point 226 and then to point 227. The current flow directional elements, however, prevent current from passing through current pathways including resistive heaters other than resistive heater 102. For example, current flow directional element 219 prevents current flow between points 228 and 229. Current flow directional elements 215-223 may be diodes as discussed above for current flow directional elements 70, 71.

Figure 8A:
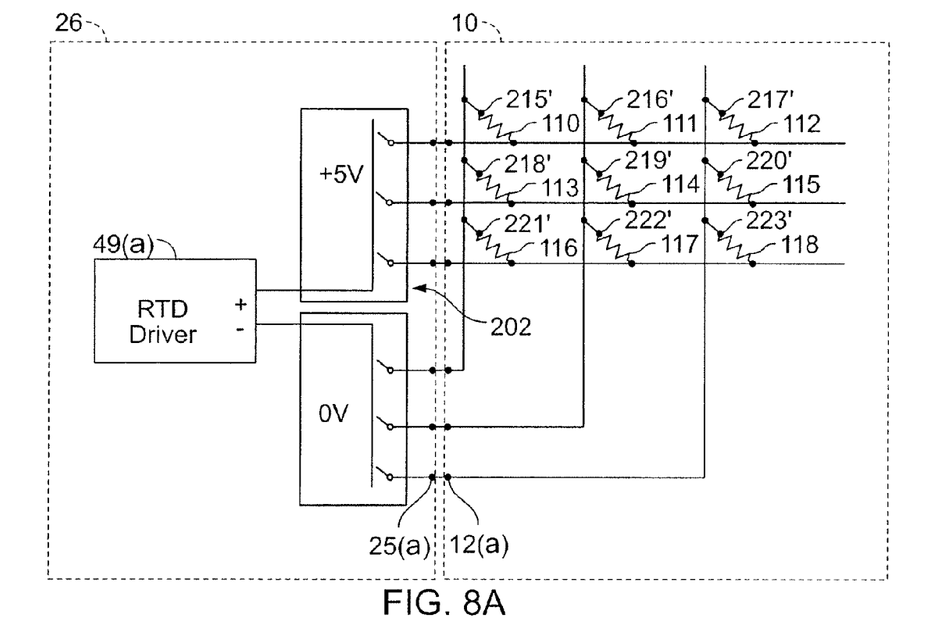
FIGS. 8A-B illustrate a technique for sharing conductive leads for resistive temperature detectors ("RTDs")
Figure 8B:
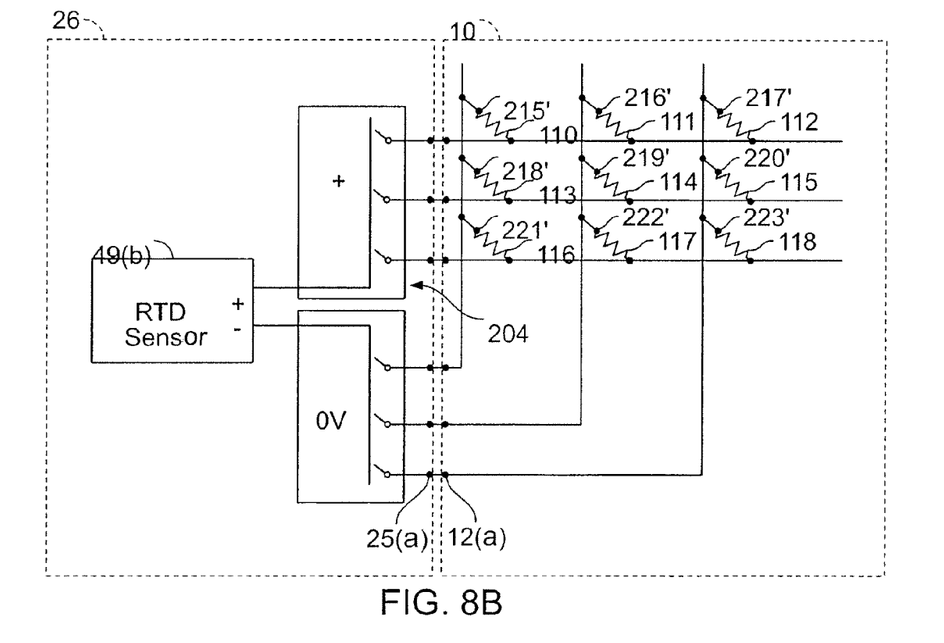

FIGS. 8A, 8B, 9A, 9B depict similar arrays for the resistive elements used to sense temperature, such as R2 shown in FIG. 5. FIG. 8A depicts one array of leads for supplying current to resistive sensors 110-118. FIG. 8B depicts another set of leads for measuring the voltage across the same resistors. With this structure, leads that are used to stimulate the resistive sensors carry no current from the heater driver 47 because they are electrically isolated from heater driver 47. Similarly, the leads for sensing the voltage of the resistive sensors 110-118 (FIG. 8B) carry essentially no current because they are isolated from the leads that supply current from heater driver 47 and RTD driver 49(a) (shown in FIGS. 7A, 7B and 8A). This structure provides the most accurate temperature measurement.

Figure 9A:
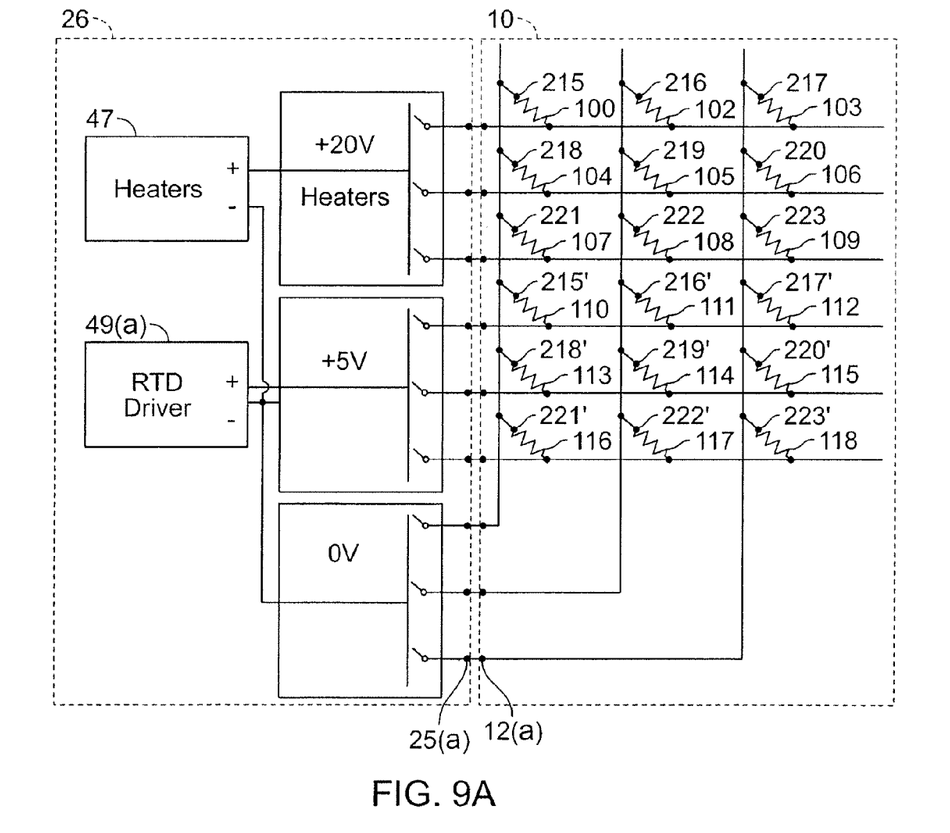
FIGS. 9A-B illustrate a technique for sharing conductive leads for resistive heaters and RTDs.
Figure 9B:
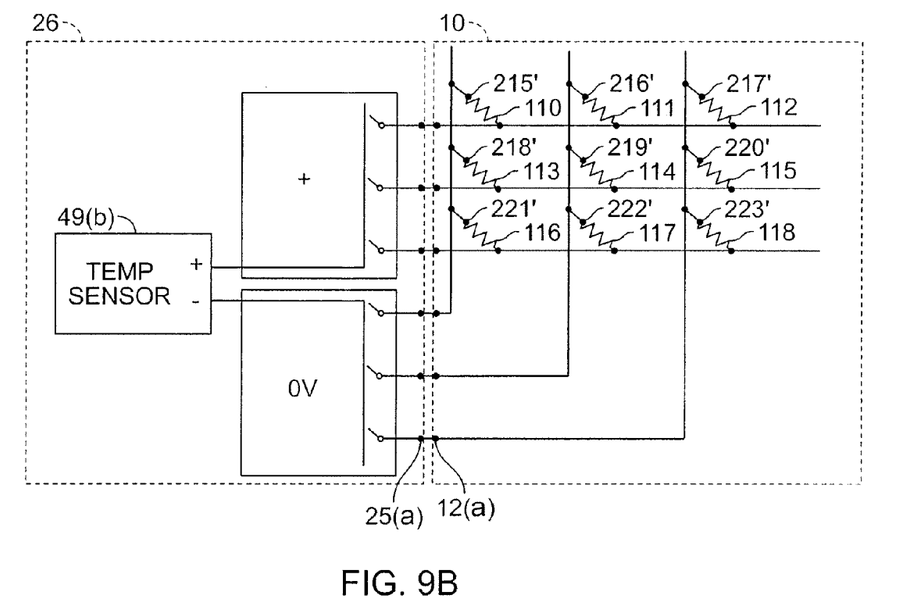

FIGS. 9A, 9B depict an alternative structure. As with the structure shown in FIGS. 8A, 8B, the leads for sensing the voltage across resistive sensors, 110-118, are isolated from both of the current sources (heater driver 47 and RTD driver 49(a)). However, both current sources 47, 49(a) share the same leads for current return, i.e., the leads depicted as columns in the array. This provides greater compression of the number of leads; however, the resistivity in the shared return leads may reduce the accuracy of the temperature measurement.

The arrays of FIGS. 8A, 8B, 9A, and 9B include current flow directional elements 215'-223', which allow current to flow in only one direction through resistive sensors 110-118. Thus, current flow directional elements 215'-223' preferably allow current to flow in only one direction between the positive terminal of RTD driver 49(a) or RTD sensor 49(b) and the negative or ground terminal of RTD driver 49(a) or RTD sensor 49(b) along a current path that includes one of resistive sensors 110-118. Preferably, current flow directional elements 215'-223' allow current to flow from the positive terminal to the negative terminal or ground terminal of either RTD driver or RTD sensor but not from the negative or ground terminal to the positive terminal thereof. Current flow directional elements 215'-223' may be diodes similar to current flow directional elements 70, 71.

While the invention has been illustratively described herein with reference to specific aspects, features and embodiments, it will be appreciated that the utility and scope of the invention is not this limited and that the invention may readily embrace other and differing variation, modifications and other embodiments. For example, the same techniques for reducing the number of leads may be applied to other types of components, not just resistors. The invention therefore is intended to be broadly interpreted and construed, as comprehending all such variations, modifications and alternative embodiments, within the spirit and scope of the ensuing claims.

A number of references are cited herein, the entire disclosures of which are incorporated herein in their entirety, by reference for all purposes. Further, none of these references, regardless of how characterized above, is admitted as prior to the invention of the subject matter claimed herein.

What is claimed is:

1. A microfluidic processing device, comprising:
a substrate comprising one or more components selected from the group consisting of: a thermally actuated pump, a thermally actuated valve, and a microfabricated reaction chamber, and further comprising a plurality of N independently controllable heating elements, each having at least two terminals, wherein each heating element is in thermal communication with one of the components;
a plurality of input/output contacts for connecting said substrate to an external controller, and a
plurality of leads for connecting said contacts to said terminals wherein each said lead connects a corresponding contact to a plurality of terminals and wherein the terminals of each said heating element are connected to a unique combination of contacts, whereby the number of contacts required to independently control said N heating elements is substantially less than the total number of terminals without requiring a separate lead for each said terminal, and wherein said controller can thereby control each said heating element independently of each other heating element.

2. The microfluidic processing device according to claim 1, wherein the number of contacts is related to the number of said heating elements by the formula, $2\sqrt{N}$.

3. The microfluidic processing device according to claim 1 further comprising at least one independently controllable resistive sensing element having at least two terminals wherein the resistive sensing element is in thermal communication with one of the components.

4. The microfluidic processing device of claim 1 wherein at least one of said independently controllable heating elements comprises a plurality of sub-components that are all activated by said external controller using the unique combination of contacts associated with said at least one independently controllable heating element.

5. The microfluidic processing device of claim 1, wherein the device includes a plurality of current flow directional elements, each configured to allow current to flow in essentially only one direction through one of the heating elements.

6. The microfluidic device of claim 1, wherein at least one of the one or more components is a thermally actuated valve and at least one of the N independently controllable heating elements is in thermal communication with the thermally actuated valve.

7. The microfluidic processing device of claim 1, wherein the one or more components includes a plurality of thermally actuated valves.

8. The microfluidic processing device of claim 1, wherein at least one of the one or more components is a thermally actuated pump comprising a volume of fluid, whereby actuation of the heating element in thermal communication with the thermally actuated pump heats the fluid and actuates the thermally actuated pump.

9. The microfluidic processing device of claim 1, wherein the one or more components includes a plurality of thermally actuated pumps each comprising a volume of fluid and, wherein each heating element in thermal communication with the plurality of thermally actuated pumps is in thermal communication with the volume of fluid of a respective thermally actuated pump.

10. The microfluidic processing device of claim 5, wherein the current flow directional elements are further configured to substantially prevent current flow in a second, opposite direction through the heating elements.

11. The microfluidic processing device of claim 5, wherein the current flow directional elements are diodes.

12. The microfluidic processing device of claim 5, wherein the current flow directional elements are formed by microfabrication on the substrate.

13. The microfluidic processing device of claim 5, wherein one or more of the current flow directional elements are disposed in series with one or more of the heating elements.

14. The microfluidic processing device of claim 1, wherein at least one of the one or more components is a microfabricated reaction chamber.

15. The microfluidic processing device of claim 14, wherein a material is present in the at least one microfabricated reaction chamber, whereby actuation of the heating element in thermal communication with the microfabricated reaction chamber raises a temperature of the material.

16. The microfluidic processing device of claim 14, wherein the device is configured to perform a polymerase chain reaction in the microfabricated reaction chamber.

17. The microfluidic processing device of claim 3, wherein the at least one resistive sensing element is configured to sense a temperature of a material within the device.

18. The microfluidic processing device of claim 5, wherein an electrical pathway between each contact and at least one terminal of each heating element includes a current flow directional element.

19. The microfluidic processing device of claim 18, wherein each heating element includes a corresponding current flow directional element.

20. The microfluidic processing device of claim 1, wherein the substrate is a first substrate that defines the heating elements, and wherein the device further comprises a second substrate, the first substrate being separate from the second substrate and wherein the first substrate can mate with the second substrate to place at least one heating element in thermal communication with one of the one or more components.

* * * * *